(12) United States Patent
Drissi et al.

(10) Patent No.: US 7,958,065 B2
(45) Date of Patent: Jun. 7, 2011

(54) RESILIENT CLASSIFIER FOR RULE-BASED SYSTEM

(75) Inventors: Youssef Drissi, Ossining, NY (US); Moon J. Kim, Wappingers Falls, NY (US); Daby M. Sow, Croton on Hudson, NY (US); Eric T. C. Yee, Los Angeles, CA (US)

(73) Assignee: International Business Machines Corporation, Armonk, NY (US)

( * ) Notice: Subject to any disclaimer, the term of this patent is extended or adjusted under 35 U.S.C. 154(b) by 701 days.

(21) Appl. No.: 12/050,372

(22) Filed: Mar. 18, 2008

(65) Prior Publication Data
US 2009/0240637 A1 Sep. 24, 2009

(51) Int. Cl.
*G06F 15/18* (2006.01)
(52) U.S. Cl. .......................................... 706/12
(58) Field of Classification Search ...................... 706/12
See application file for complete search history.

(56) References Cited

U.S. PATENT DOCUMENTS

| | | | |
|---|---|---|---|
| 6,694,303 B1* | 2/2004 | Agrawal et al. | 706/52 |
| 6,892,189 B2* | 5/2005 | Quass et al. | 706/12 |
| 6,931,403 B1* | 8/2005 | Agrawal et al. | 707/752 |
| 6,950,812 B2 | 9/2005 | Suermondt et al. | |
| 7,349,746 B2* | 3/2008 | Emigholz et al. | 700/21 |
| 7,424,395 B2* | 9/2008 | Emigholz et al. | 702/182 |
| 7,426,497 B2* | 9/2008 | Bacioiu et al. | 706/12 |
| 7,522,552 B2* | 4/2009 | Fein et al. | 370/328 |
| 7,567,887 B2* | 7/2009 | Emigholz et al. | 702/182 |
| 7,720,641 B2* | 5/2010 | Alagappan et al. | 702/183 |
| 7,725,091 B2* | 5/2010 | Legouable et al. | 455/277.1 |
| 7,761,172 B2* | 7/2010 | Nguyen et al. | 700/30 |
| 2004/0064464 A1 | 4/2004 | Forman et al. | |
| 2005/0100209 A1 | 5/2005 | Lewis et al. | |
| 2006/0074908 A1 | 4/2006 | Selvaraj et al. | |
| 2006/0190481 A1 | 8/2006 | Alspector et al. | |
| 2006/0218110 A1 | 9/2006 | Simske et al. | |
| 2006/0224543 A1 | 10/2006 | Clymer et al. | |

OTHER PUBLICATIONS

An adaptive classifier design for high-dimensional data analysis with a limited training data set, Jackson, Q.; Landgrebe, D.A.; Geoscience and Remote Sensing, IEEE Transactions on vol. 39 , Issue: 12 Digital Object Identifier: 10.1109/36.975001 Publication Year: 2001 , pp. 2664-2679.*

A self-improving classifier design for high-dimensional data analysis with a limited training data set, Jackson, Q.; Landgrebe, D.; Geoscience and Remote Sensing Symposium, 2001. IGARSS '01. IEEE 2001 International vol. 1 Digital Object Identifier: 10.1109/IGARSS.2001.976209 Publication Year: 2001 , pp. 521-523 vol. 1.*

(Continued)

*Primary Examiner* — Michael Holmes
(74) *Attorney, Agent, or Firm* — William Schiesser; Hoffman Warnick LLC

(57) ABSTRACT

A resilient classifier for using with a rule-based system is provided. A system for classifying data for a rule-based system, may include: a system(s) for generating two training data sets, one data set is generated from input data while the second data set is generated from disturbed data; a system for merging the two training data sets; and a system for training a data classifier with the merged training data sets. As a result, the classification of data becomes more accurate, including when disturbed data is encountered.

23 Claims, 10 Drawing Sheets

OTHER PUBLICATIONS

Supervised Self-taught Learning: Actively transferring knowledge from unlabeled data, Huang, K.; Zenglin Xu; King, I.; Lyu, M.R.; Campbell, C.; Neural Networks, 2009. IJCNN 2009. International Joint Conference on Digital Object Identifier: 10.1109/IJCNN.2009. 5178647 Publication Year: 2009 , pp. 1272-1277.*

A Novel Hybrid Linear/Nonlinear Classifier for Two-Class Classification: Theory, Algorithm, and Applications, Weijie Chen; Metz, C.E.; Giger, M.L.; Drukker, K.; Medical Imaging, IEEE Transactions on vol. 29 , Issue: 2 Digital Object Identifier: 10.1109/TMI.2009. 2033596 Publication Year: 2010 , pp. 428-441.*

Macskassy et al., Adding Numbers to Text Classification, Proceedings of the 12th International Conference on Information and Knowledge Management, Nov. 3-8, 2003, New Orleans, Louisiana, USA.

* cited by examiner

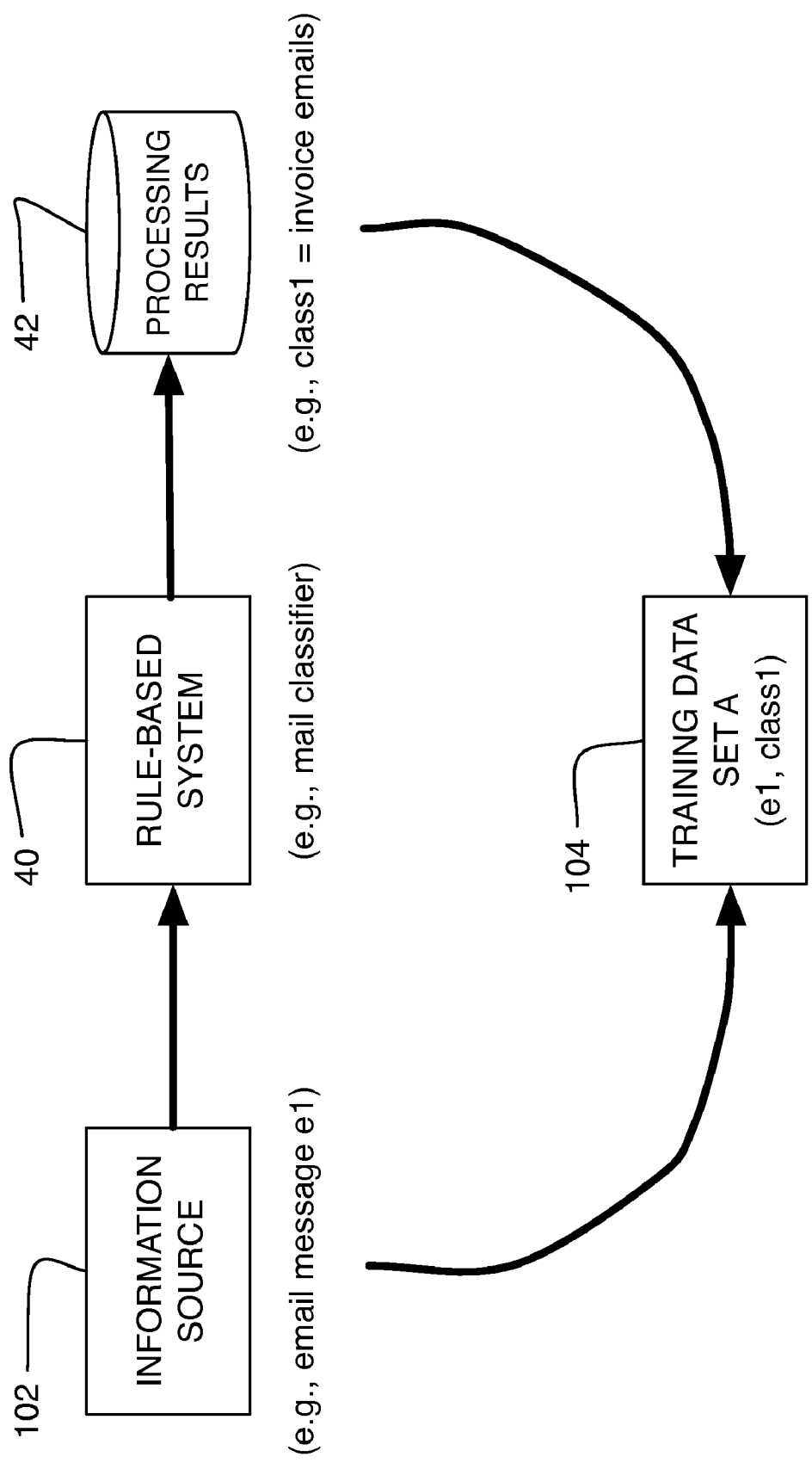

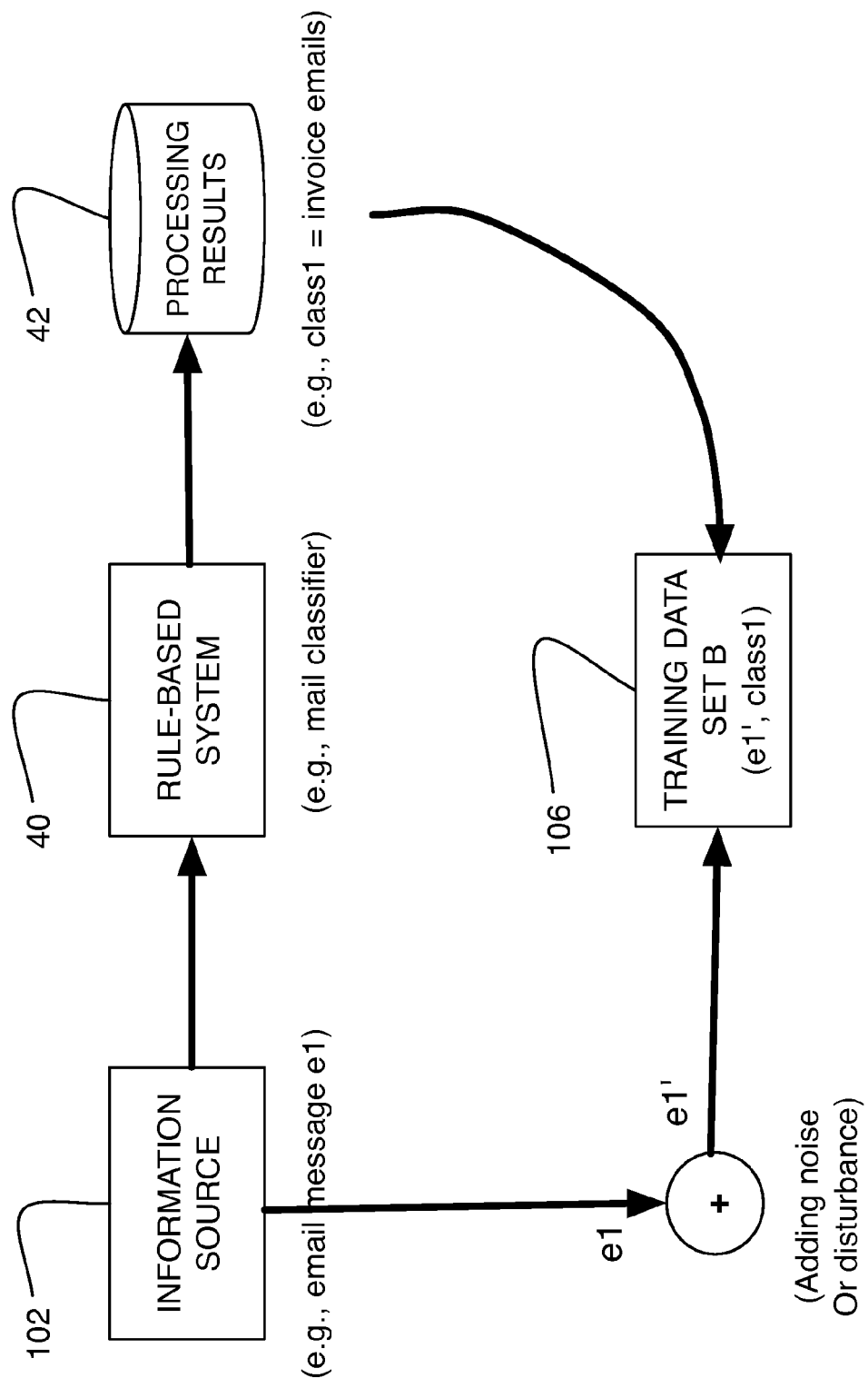

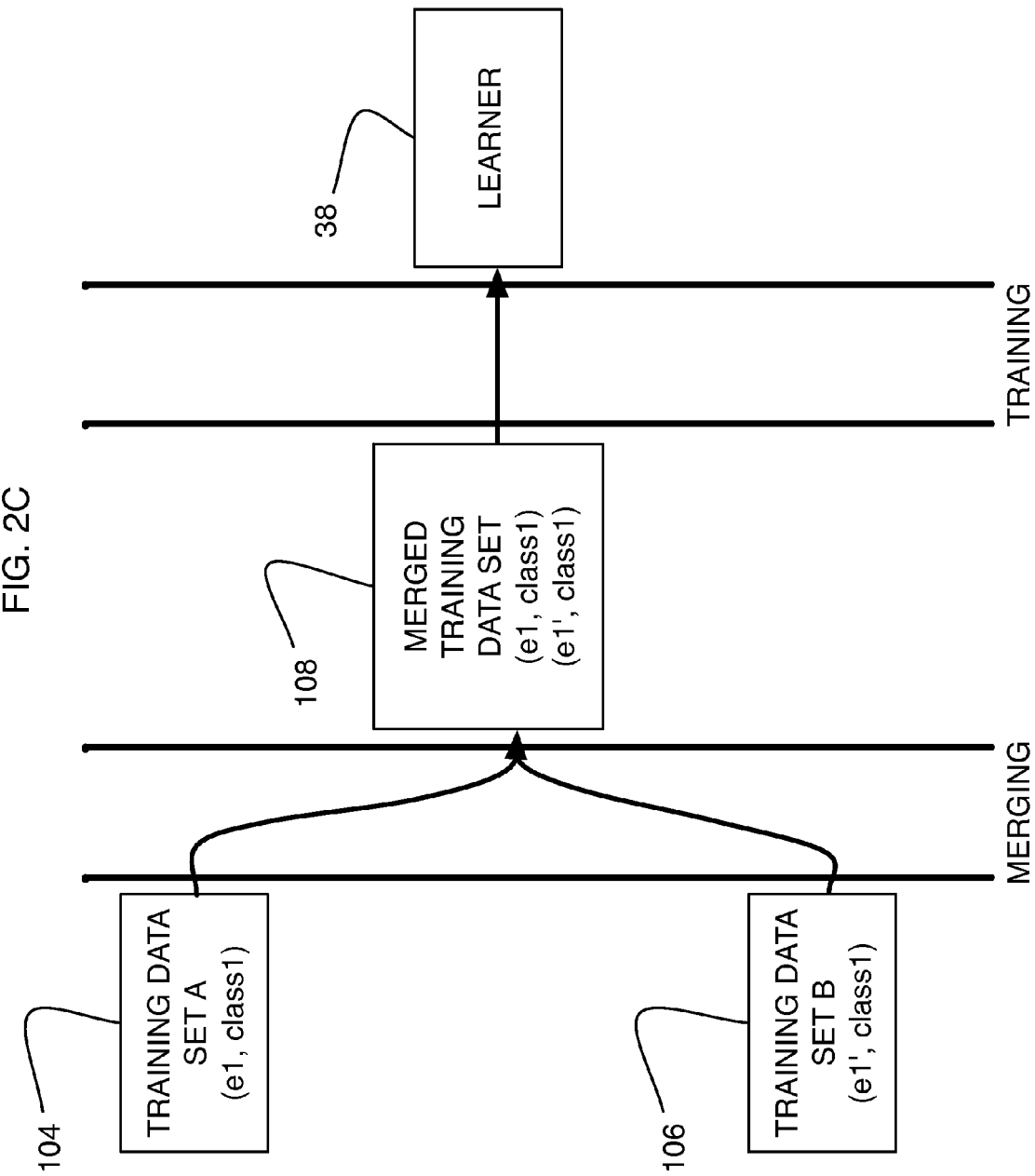

RESILIENT CLASSIFIER FOR RULE-BASED SYSTEM

FIELD OF THE INVENTION

Aspects of the invention relate generally to rule-based systems and, more particularly, to a resilient classifier for a rule-based system.

BACKGROUND OF THE INVENTION

Rule-based systems may be used to classify data and/or documents, such as electronic mail messages (i.e., emails), into different groups often using "Expert Rules". A shortcoming of the rule-based system is its lack of resiliency to small disturbances. That is, expert rules typically only work with expected, predefined and/or anticipated inputs. However, if the inputs change, even slightly, classification errors result.

Accordingly, there is an opportunity to improve upon existing rule-based systems.

SUMMARY OF THE INVENTION

Aspects of the invention provide a resilient classifier for a rule-based system.

A first aspect of the invention provides a method for classifying data for a rule-based system, comprising: generating a first training data set from input data; generating a second training data set from disturbed data; merging the first training data set and the second training data set; and training a data classifier with the merged first training data set and second training data set.

A second aspect of the invention provides a system for classifying data for a rule-based system, comprising: a system for generating a first training data set from input data; a system for generating a second training data set from disturbed data; a system for merging the first training data set and the second training data set; and a system for training a data classifier with the merged first training data set and second training data set.

A third aspect of the invention provides a computer program comprising program code stored on a computer-readable medium, which when executed, enables a computer system to implement a method for classifying data for a rule-based system, the method comprising: generating a first training data set from input data; generating a second training data set from disturbed data; merging the first training data set and the second training data set; and training a data classifier with the merged first training data set and second training data set.

A fourth aspect of the invention provides a method of generating a system for classifying data for a rule-based system, the method comprising: providing a computer system operable to: generate a first training data set from input data; generate a second training data set from disturbed data; merge the first training data set and the second training data set; and train a data classifier with the merged first training data set and second training data set.

A fifth aspect of the invention provides a data processing system for classifying data for a rule-based system, comprising: a processing unit; a bus coupled to the processing unit; and a memory medium coupled to the bus comprising program code, which when executed by the processing unit causes the data processing system to: generate a first training data set from input data; generate a second training data set from disturbed data; merge the first training data set and the second training data set; and train a data classifier with the merged first training data set and second training data set.

A sixth aspect of the invention provides computer software embodied in at least one propagated signal for classifying data for a rule-based system, the at least one propagated signal comprising instructions for causing at least computer system to: generate a first training data set from input data; generate a second training data set from disturbed data; merge the first training data set and the second training data set; and train a data classifier with the merged first training data set and second training data set.

A seventh aspect of the invention provides a business method for managing a method for classifying data for a rule-based system, the business method comprising: managing a network that includes at least one computer system that performs the process described herein; and receiving payment based on the managing.

The illustrative aspects of the invention are designed to solve one or more of the problems herein described and/or one or more other problems not discussed.

BRIEF DESCRIPTION OF THE DRAWINGS

These and other features of the invention will be more readily understood from the following detailed description of the various aspects of the invention taken in conjunction with the accompanying drawings that depict various embodiments of the invention, in which:

FIGS. 2A-2D show a process flow for employing a resilient classifier for a rule-based system according to an embodiment of the invention.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide a resilient classifier for a rule-based system. The resilient classifier creates a system that gives correct results (e.g., classifications) with regard to input data that even is changed slightly. A method of the present invention provides for the use of two classifiers in tandem. The first classifier (i.e., rule-based system) classifies the data into a first training data set. The second classifier adds noise on the training data set before learning its rule set. The addition of noise aids in ensuring that the concepts learned by the second classifier are wider than the concepts expressed in the rules of the first classifier. In an embodiment of the invention, a system for classifying data for a rule-based system, includes: a system for generating a first training data set from input data; a system for generating a second training data set from disturbed data; a system for merging the first training data set and the second training data set; and a system for training a data classifier with the merged first training data set and second training data set. As used herein, unless otherwise noted, the term "set" means one or more (i.e., at least one); and the phrase "any solution" means any now known or later developed solution.

Figure 1:
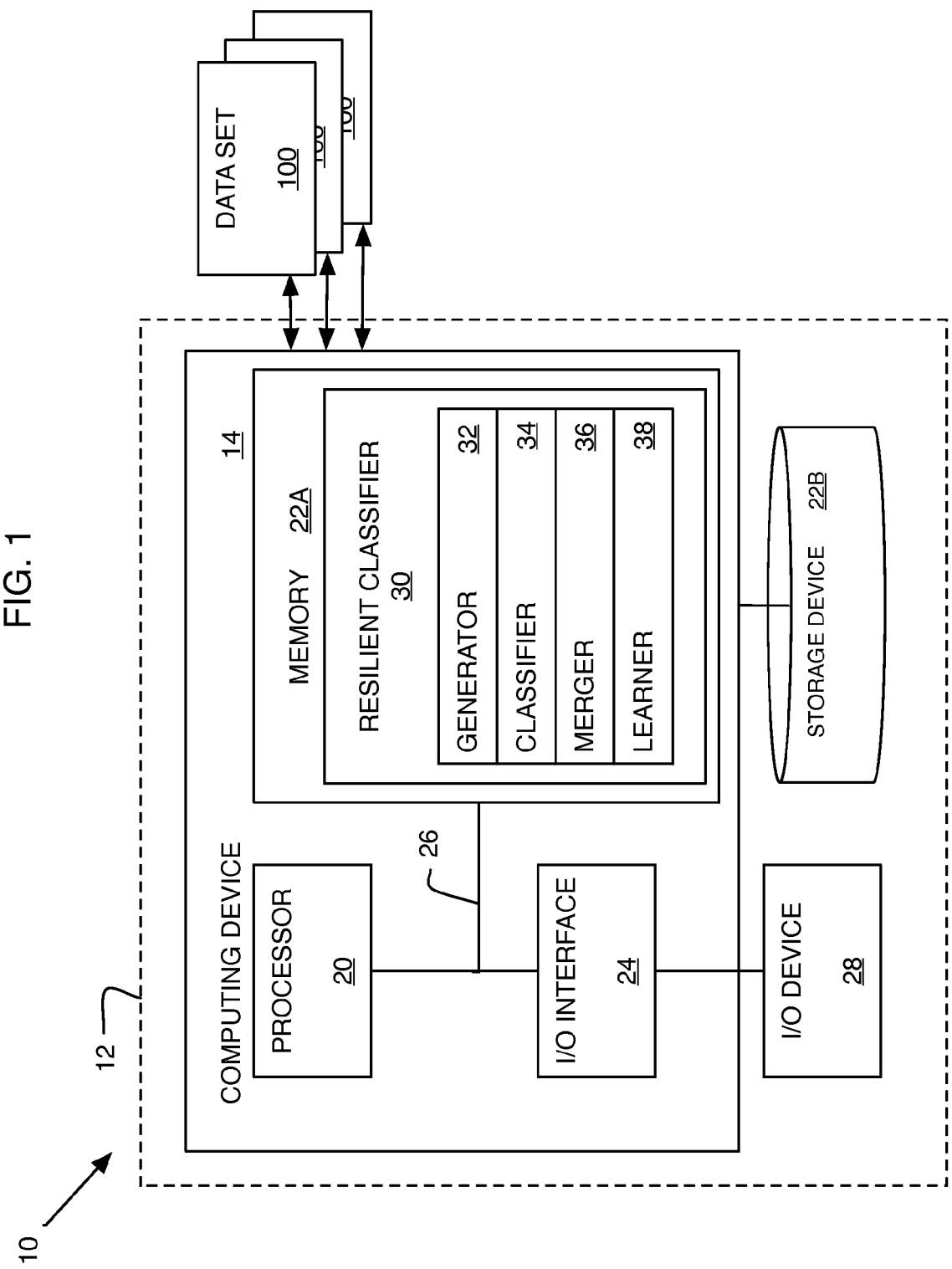
FIG. 1 shows an illustrative environment for employing a resilient classifier for a rule-based system according to an embodiment of the invention.

Turning to the drawings, FIG. 1 shows an illustrative environment 10 for employing a resilient classifier for a rule-based system according to an embodiment of the invention. To this extent, environment 10 includes a computer system 12 that can perform the process described herein in order to provide a resilient classifier. In particular, computer system 12 is shown including a computing device 14 that comprises a resilient classifier 30, which makes computing device 14 operable for classifying data for a rule-based system, by performing the process described herein.

Computing device 14 is shown including a processor 20, a memory 22A, an input/output (I/O) interface 24, and a bus 26. Further, computing device 14 is shown in communication with an external I/O device/resource 28 and a storage device 22B. In general, processor 20 executes program code, such as resilient classifier 30, which is stored in a storage device, such as memory 22A and/or storage device 22B. While executing program code, processor 20 can read and/or write data, such as data set(s) 100 to/from memory 22A, storage device 22B, and/or I/O interface 24. Bus 26 provides a communications link between each of the components in computing device 14. I/O device 28 can comprise any device that transfers information between a user and computing device 14 and/or other entities (e.g., data sets 100, etc.) and computing device 14. To this extent, I/O device 28 can comprise a user I/O device to enable an individual user 16 to interact with computing device 14 and/or a communications device to enable an entity (e.g., user, etc.) to communicate with computing device 14 using any type of communications link.

In any event, computing device 14 can comprise any general purpose computing article of manufacture capable of executing program code installed thereon. However, it is understood that computing device 14 and resilient classifier 30 are only representative of various possible equivalent computing devices that may perform the process described herein. To this extent, in other embodiments, the functionality provided by computing device 14 and resilient classifier 30 can be implemented by a computing article of manufacture that includes any combination of general and/or specific purpose hardware and/or program code. In each embodiment, the program code and hardware can be created using standard programming and engineering techniques, respectively.

Similarly, computer system 12 is only illustrative of various types of computer systems for implementing aspects of the invention. For example, in one embodiment, computer system 12 comprises two or more computing devices that communicate over any type of communications link, such as a network, a shared memory, or the like, to perform the process described herein. Further, while performing the process described herein, one or more computing devices in computer system 12 can communicate with one or more other computing devices external to computer system 12 using any type of communications link. In either case, the communications link can comprise any combination of various types of wired and/or wireless links; comprise any combination of one or more types of networks; and/or utilize any combination of various types of transmission techniques and protocols.

As discussed herein, resilient classifier 30 enables computer system 12 to classify data for a rule-based system. To this extent, resilient classifier 30 is shown with a plurality of modules, or systems, including a generator 32, a classifier 34, a merger 36, and a learner 38. Operation of each of these modules is discussed further herein. However, it is understood that some of the various modules shown in FIG. 1 can be implemented independently, combined, and/or stored in memory of one or more separate computing devices that are included in computer system 12. Further, it is understood that some of the modules and/or functionality may not be implemented, or additional modules and/or functionality may be included as part of computer system 12.

Aspects of the invention provide a resilient classifier for a rule-based system. To this extent, FIGS. 2A through 4B show various configurations, methods, and systems that may employ the computer system 12 of FIG. 1, according to embodiments of the invention. For example, a user, in using an email system, may wish for more accurate classification of incoming and outgoing email threads.

Aspects of the invention allow the computer system 12 employing a resilient classifier 30 to classify data for a rule-based system. As a result, a system is created that, more often, gives the correct results (e.g., classifications) even if the input (e.g., data source) is changed slightly. Aspects of the invention make rule-based systems more resilient to small disturbance in the data sources, by having a learner learn to classify disturbed inputs the same way it classifies "expected" input. In an embodiment, the "disturbed" input is generated by adding noise to the original input.

Referring to FIG. 2A, a first training data set is generated from input data. As shown, an information source, or input data, 102 in consort with a rule-based system 40 and processing results 42 may generate Training Data Set A 104. In an embodiment the information source, or input data 102 may comprise electronic mail (email) messages. In such an embodiment, the rule-based system 40 may comprise a mail classifier. For example, email message "e1" may comprise the input data 102 and the processing results 42 include a rule wherein "class 1=invoice emails". As such, the mail classifier 40, applies the rule to email message e1 so that email e1 should be classified in the "invoice emails" class (i.e., class 1). In this manner the training data set A, made up of (e1, class 1), is generated and this information is stored as a learned rule.

Referring to FIG. 2B, a second training data set is generated from disturbed data. Similar to the first training data set generated in FIG. 2A, the second training data set (i.e., Set B) 106 results from the adding of noise and/or a disturbance to the input data, or information source 102. As in the embodiment wherein the data is email, the email message e1 has some noise data added so that the resultant disturbed data is email message e1'. Similarly to the generation of the first training data set (FIG. 1), the mail classifier applies the processing results (e.g., class1=invoice emails) to the disturbed data thereby creating training data set B (e.g., e1', class1). In this manner, the rule-based system learns that email e1', derived by disturbing email e1 with some "noise" data, still should be classified in the "invoice emails" class (i.e., class1). As a result, this information is stored as a learned rule.

The noise or disturbance added to the data set so as to generate the second data set can be made from any known or later developed solution for slightly altering data. Various algorithms may be employed in creating and adding the noise or disturbance. For example, in the case where the data is text data, a word and/or term may be replace with its/their synonym(s). As a result, a modified (with synonyms) email message, for example, conveys the same semantics and, therefore, will be classified the same way as the "original" (i.e., non-disturbed) email message. In another embodiment, a slot grammar parser is used to parse the email message(s) into a tree. The parsed tree is manipulated and transformed. For example, the subject and object of an action could be swapped so as to change the voice of the sentence (i.e., from active to passive voice; from passive to active voice). For example, the sentence "IBM acquired Lotus", after changing the voice, would end being "Lotus was acquired by IBM." The result herein is, for example, a modified email message expressed differently but conveying the same meaning and semantic, and therefore should be classified in the same "semantic" class. Other noise or disturbance under aspects of the invention include misspelling word(s); abbreviation of word(s); translation of sentences; and/or the like.

Referring to FIG. 2C, the first training data set 104 and the second training data set 106 are merged into a merged training data set 108. As shown, a learner, or data classifier, 38 is trained with the merged training data set 108. In the email embodiment, the expected original data (e.g., (e1, class1) and the disturbed data (e.g., (e1', class1) are merged. In this manner, the learner 38 may be used instead of the rule-based system because it is resilient to small disturbance in the expected, input data.

Figure 2D:
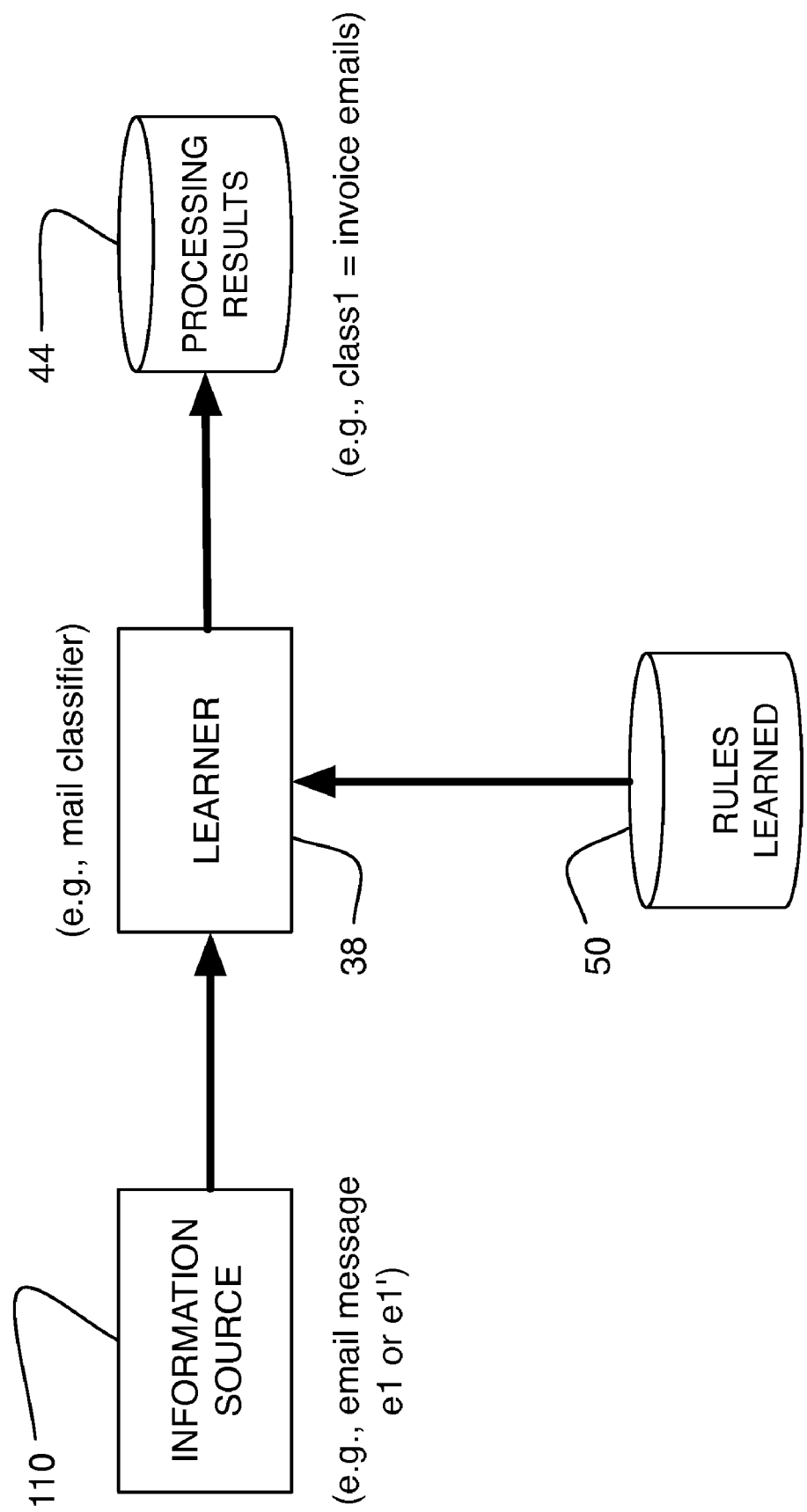

Referring to FIG. 2D, a new data set, or information source, 110 may be obtained by the learner 38. Because the learner 38 has been trained with both the expected and disturbed data instead of the rule-based system, the learner 38 is able to classify the new data set 110 based on rules learned 50. In this manner the learner 38 is resilient to small disturbance in the expected, input data, or information source 110. In the email embodiment, email message e1 and/or e1' are classified as invoice emails (i.e., class1) by the learner 38 based on the rules learned 50 previously.

Figure 3A:
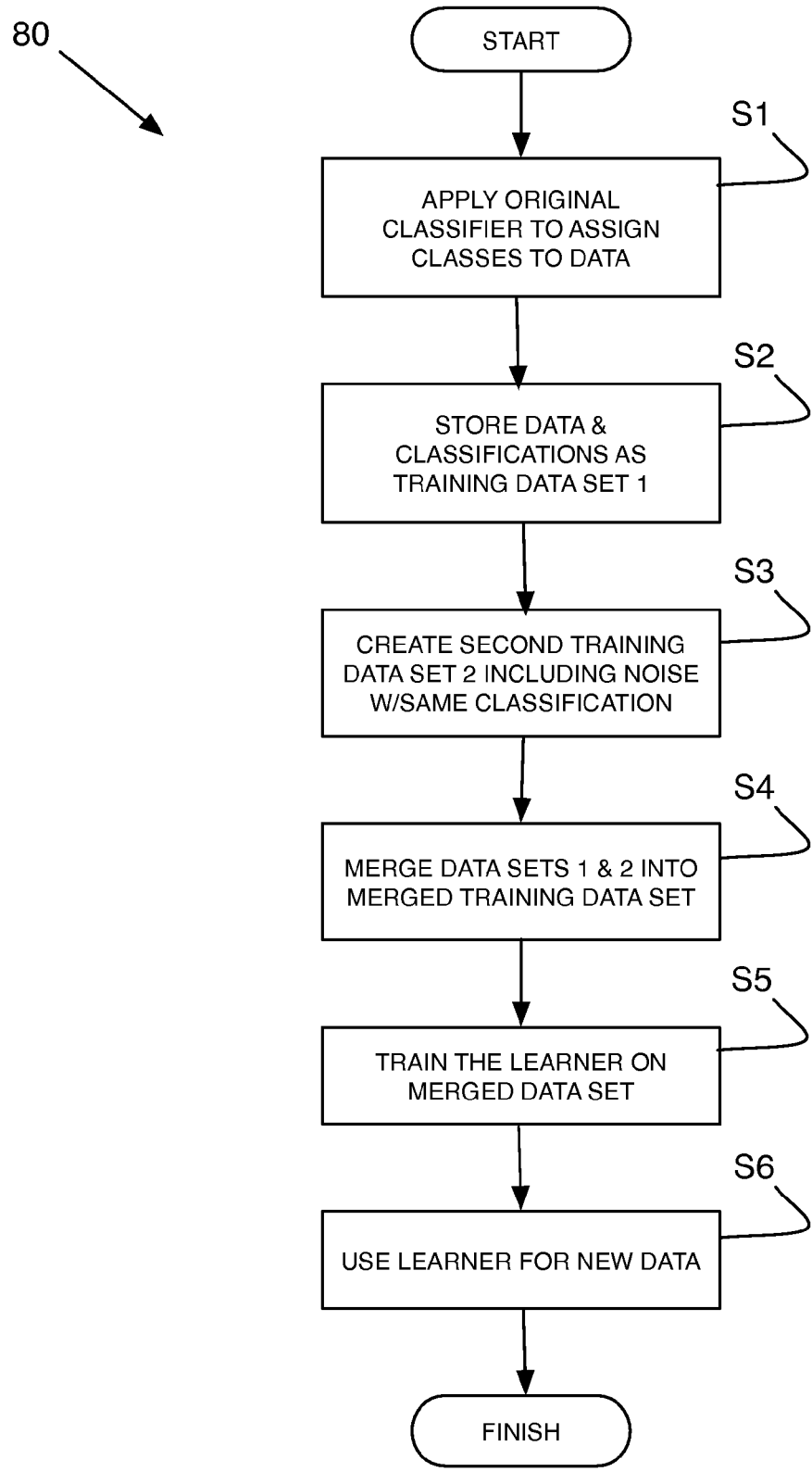
FIG. 3A shows a flowchart for employing a resilient classifier according to an embodiment of the invention.
Figure 3B:
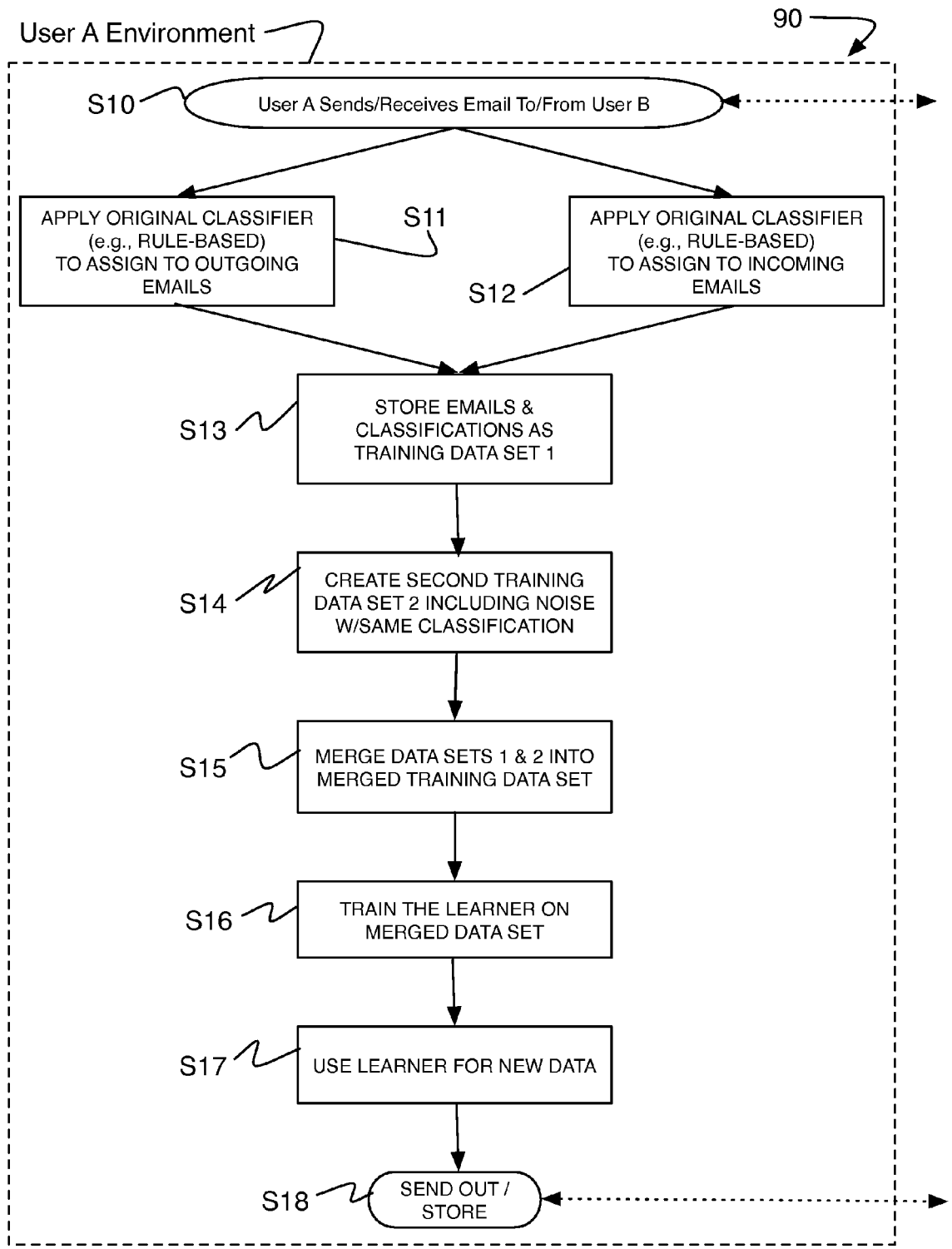
FIG. 3B shows a flowchart for employing a resilient classifier for email threads according to an embodiment of the invention.
Figure 3C:
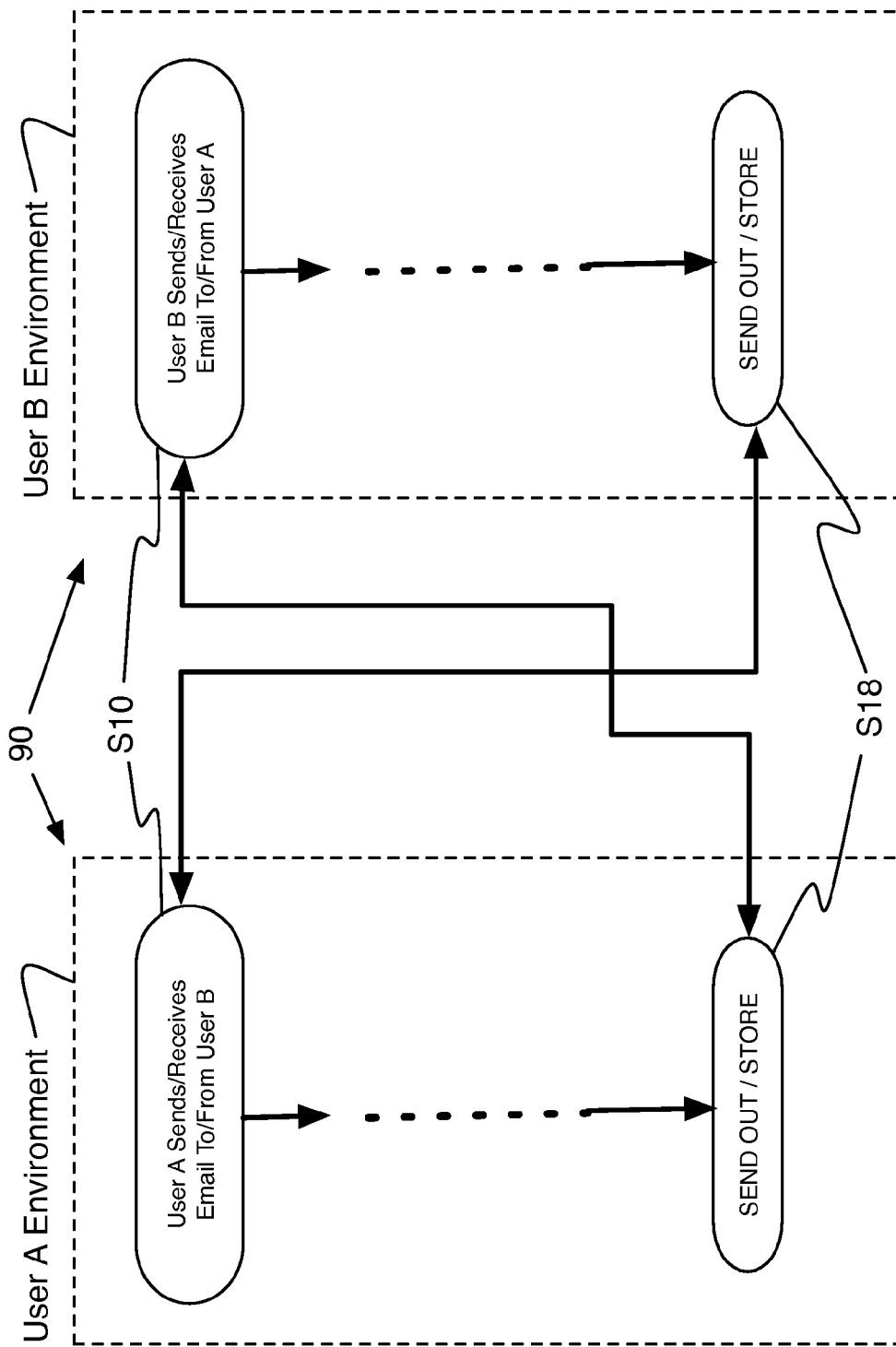
FIG. 3C shows interaction between two user's flowcharts for employing resilient classifiers according to an embodiment of the invention.

Turning now to FIGS. 3A through 3C, various flow charts depict embodiments of methods of the present invention. For example, FIG. 3A depicts a process 80 that starts at S1, wherein an original classifier (e.g., rule-based system) is applied to assigned classes to incoming data. At S2, the data and its respective classification(s) are stored as training data set 1. At S3, a second training data set is created by adding noise and/or a disturbance to the data from training set 1 and keeping the same respective classification(s). At S4 the two training data sets (i.e., first and second) are merged into a training data set. At S5, the learner is trained on the merged training data set, thereby enabling the learner to classify both original and disturbed data. Finally, at S6, the trained learner then may be used to classify new, incoming data.

Referring to FIG. 3B, a flowchart 90 for providing a resilient classifier wherein the data is email is depicted. The flowchart 90, from the perspective of a User A, starts at S10 wherein User A either sends to, or receives from User B an email. Depending on whether the email was sent or received by User A, S11 or S12 ensues wherein an original classifier (e.g., rule-based system) is applied to assigned classes to the outgoing (at S11) or incoming (at S12) emails. At S13, the emails (incoming and/or outgoing) and their classifications are stored as training data set 1. At S14, a second training data set 2 is created by adding noise or disturbances to the emails from training data set 1 and keeping the same classifications as employed in S11 and/or S12. At S15, training data set 1 and training data set 2 are merged. At S16, the learner is training on merged training data set, so as to enable the learner to classify both original, and disturbed, emails. At S17, the learner is used to classify new, incoming and/or outgoing emails thereby creating email message threads. Finally, at S18 the email message threads are stored and/or sent out (e.g., to User B).

FIG. 3C depicts the interaction between User environments (e.g., User A, User B) and their respective flowcharts 90. Referring back to FIG. 3B, steps S11 through S17 are omitted for purposes of clarity only. User A at S10 sends an email to User B, whereby User B at S18 stores the email (e.g., for future classifying). Similarly, User A at S18 sends out an email (after being classified in flowchart 90), whereby User B receives the sent email at S10. Similarly, User B at S18 sends out an email (after being classified in flowchart 90), whereby User A receives the sent email at S10. Similarly, User B at S10 sends an email to User A, whereby User A at S18 stores the email (e.g., for future classifying). In this manner, a plurality of users (e.g., User A, User B, etc.) may employ resilient classifiers in accordance with aspects of the present invention so as to improve the classification of exchanged data (e.g., emails).

Figure 4A:
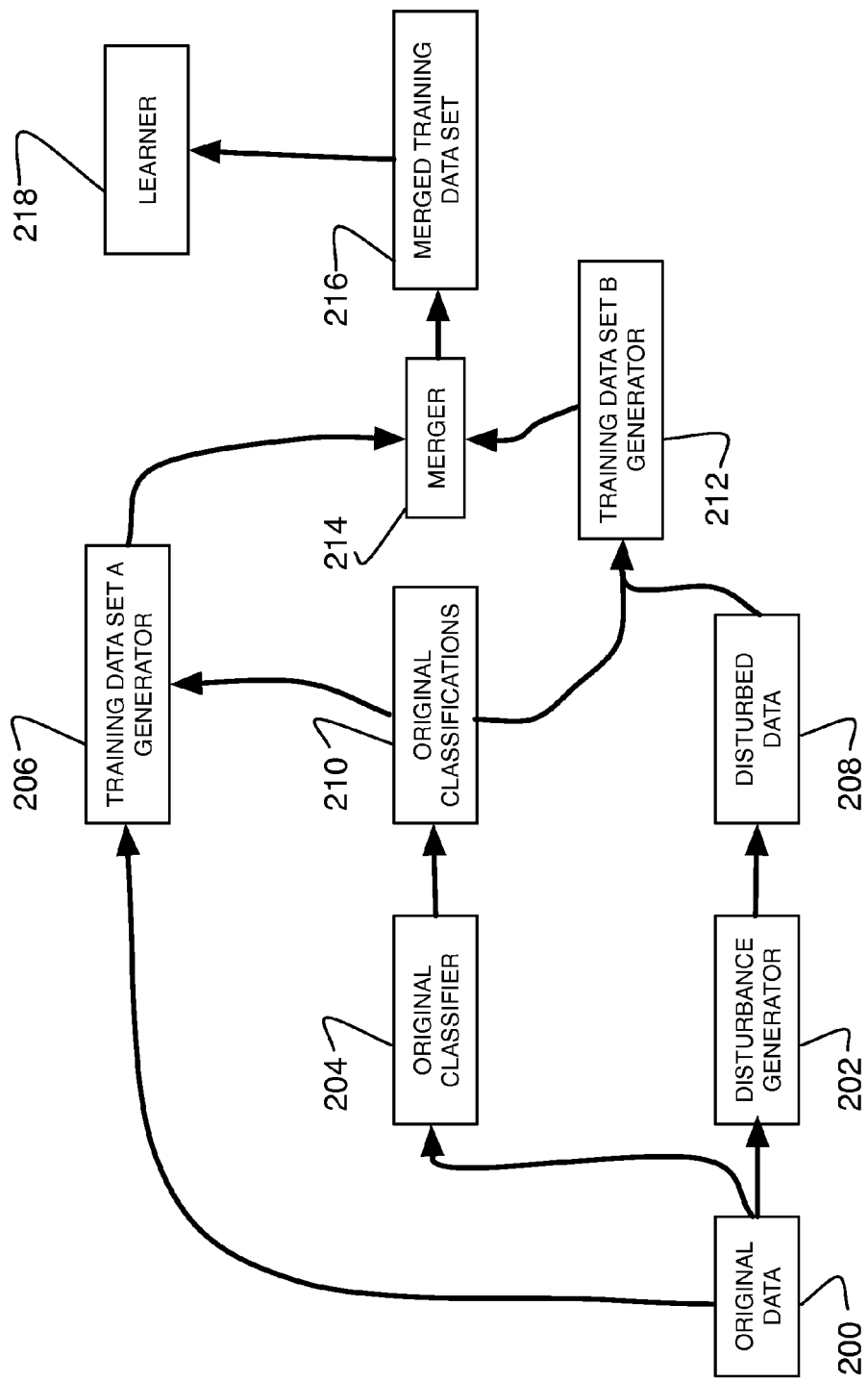
FIGS. 4A-4B show system diagrams according to embodiments of the invention.
Figure 4B:
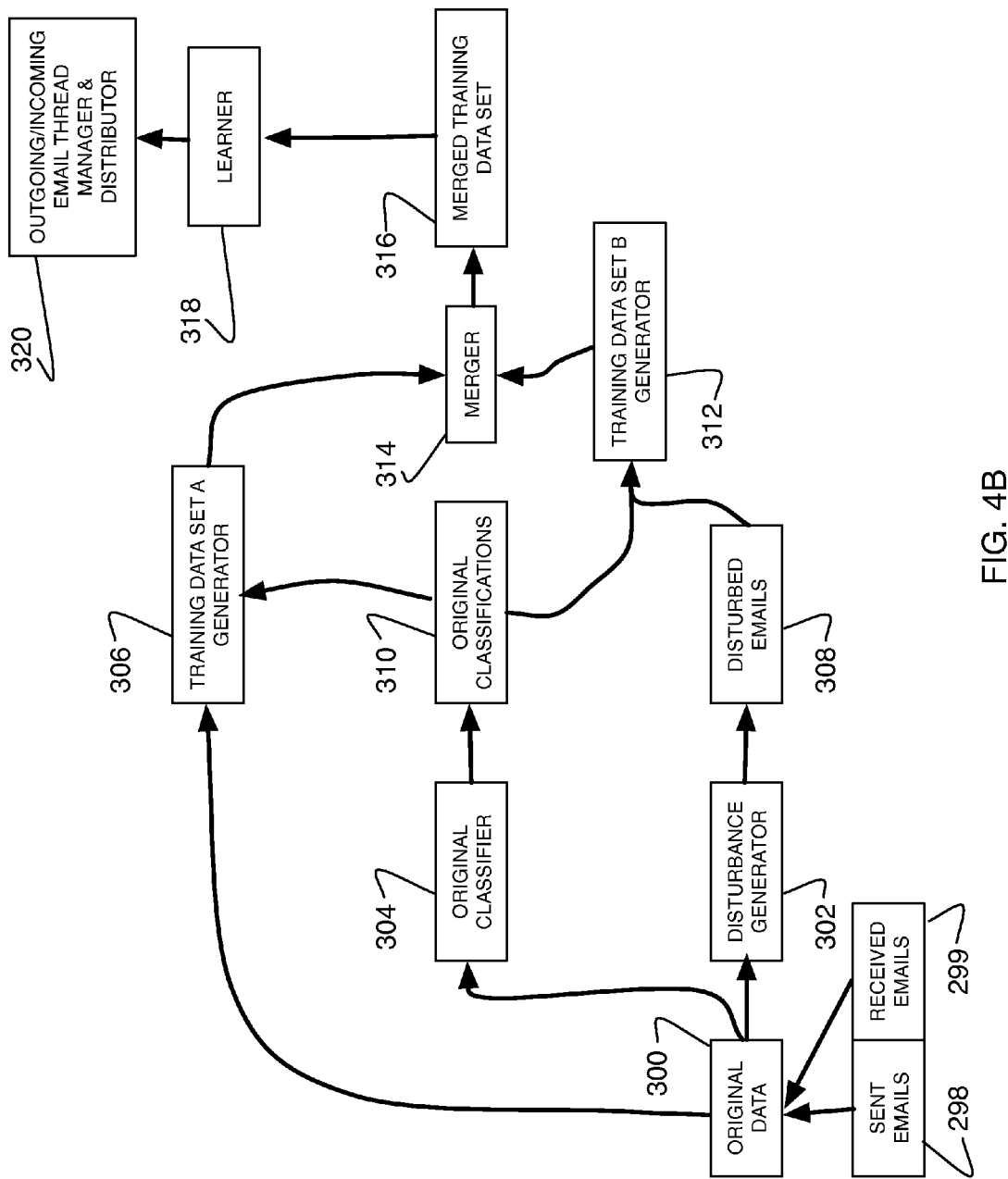

FIGS. 4A and 4B depict system diagrams for employing a resilient classifier for generic data, and email, respectively. As shown in FIG. 4A, original data 200 is generated into training data set A by generator at 206 having been classified with original classifications 210 by original classifier 204. Similarly, original data 200 is generated into training data set B by generator at 212 having been classified with original classifications 210 by original classifier 204 and having disturbed data 208 generated by a disturbance generator 202. At 214 a merger merges the two training data sets (e.g., set A and set B) into a merged training data set 216. At 218 a learner is able to "learn" from the merged training data set 216.

Referring to FIG. 4B, original data 300 is comprises of sent emails 298 and/or received emails 299. The original data 300 is generated into training data set A by generator at 306 having been classified with original classifications 310 by original classifier 304. Similarly, original data 300 is generated into training data set B by generator at 312 having been classified with original classifications 310 by original classifier 304 and having disturbed data 308 generated by a disturbance generator 302. At 314 a merger merges the two training data sets (e.g., set A and set B) into a merged training data set 316. At 318, a learner is able to "learn" from the merged training data set 316. At 320, an email thread manager and distributor distributes incoming/outgoing email threads.

Under the aspects of the present invention the data classified by the resilient classifier includes any type of data nor known or later developed that is capable of being classified. For example, the data may comprise multimedia data, video, images, text data, including email and/or the like.

In another embodiment, the invention provides a computer program stored on a computer-readable medium, which when executed, enables a computer system to provide a resilient classifier for a rule-based system. To this extent, the computer-readable medium includes program code, such as resilient classifier 30 (FIG. 1), which implements the process described herein. It is understood that the term "computer-readable medium" comprises one or more of any type of tangible medium of expression capable of embodying a copy of the program code (e.g., a physical embodiment). In particular, the computer-readable medium can comprise program code embodied on one or more portable storage articles of manufacture, on one or more data storage portions of a computing device, such as memory 22A (FIG. 1) and/or storage system 22B (FIG. 1), as a data signal traveling over a network (e.g., during a wired/wireless electronic distribution of the computer program), on paper (e.g., capable of being scanned and converted to electronic data), and/or the like.

In another embodiment, the invention provides computer software embodied in at least one propagated signal for providing a resilient classifier for a rule-based system, the at least one propagated signal comprising instructions for causing at least computer system to: generate a first training data set from input data; generate a second training data set from disturbed data; merge the first training data set and the second training data set; and train a data classifier with the merged first training data set and second training data set.

In another embodiment, the invention provides a method of generating a system for classifying data for a rule-based system. In this case, a computer system, such as computer system 12 (FIG. 1), can be obtained (e.g., created, maintained, having made available to, etc.) and one or more programs/systems for performing the process described herein can be obtained (e.g., created, purchased, used, modified, etc.) and deployed to the computer system. To this extent, the deployment can comprise one or more of: (1) installing program code on a computing device, such as computing device 14 (FIG. 1), from a computer-readable medium; (2) adding one or more computing devices to the computer system; and (3) incorporating and/or modifying one or more existing devices of the computer system, to enable the computer system to perform the process described herein.

In still another embodiment, the invention provides a business method that manages a method for classifying data for a rule-based system, which enables users to perform the process described herein on a subscription, advertising, and/or fee basis. That is, a service provider could offer to manage a network and/or a computer system 12 (FIG. 1) that provides a resilient classifier as described herein. In this case, the service provider can manage (e.g., create, maintain, support, etc.) a virtual and/or physical network that enables users to communicate content using computer systems, such as computer system 12, that perform the process described herein. In return, the service provider can receive payment from the user(s) under a subscription and/or fee agreement, receive payment from the sale of advertising to one or more third parties, and/or the like.

As used herein, it is understood that "program code" means any set of statements or instructions, in any language, code or notation, that cause a computing device having an information processing capability to perform a particular function either directly or after any combination of the following: (a) conversion to another language, code or notation; (b) reproduction in a different material form; and/or (c) decompression. To this extent, program code can be embodied as any combination of one or more types of computer programs, such as an application/software program, component software/a library of functions, an operating system, a basic I/O system/driver for a particular computing, storage and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method for classifying data for a rule-based system, comprising:
    generating a first training data set from input data;
    generating a second training data set from disturbed data;
    merging the first training data set and the second training data set; and
    training a data classifier with the merged first training data set and second training data set.

2. The method of claim 1, further comprising:
    receiving a data set; and
    using the trained data classifier to classify the received data set.

3. The method of claim 1, wherein the data comprises text data.

4. The method of claim 1, wherein generating the second data set comprises adding noise or a disturbance to the first data set.

5. The method of claim 4, the adding comprising at least one of:
    replacing a term in the first data set with a synonym;
    replacing a term in the first data set with a misspelled term; and
    changing a voice of a phrase in the first data set.

6. The method of claim 1, wherein the data classifier is an electronic mail classifier.

7. The method of claim 1, wherein the generating the first training data set from input data is done with a rule-based system.

8. A system for classifying data for a rule-based system, comprising:
    a system for generating a first training data set from input data;
    a system for generating a second training data set from disturbed data;
    a system for merging the first training data set and the second training data set; and
    a system for training a data classifier with the merged first training data set and second training data set.

9. The system of claim 8, further comprising:
    a system for receiving a data set; and
    a system for using the trained data classifier to classify the received data set.

10. The system of claim 8 wherein the data comprises text data.

11. The system of claim 8, wherein the system for generating the second data set comprises a system for adding noise or a disturbance to the first data set.

12. The system of claim 11, the system for adding comprising at least one of:
    a system for replacing a term in the first data set with a synonym;
    a system for replacing a term in the first data set with a misspelled term; and
    a system for changing a voice of a phrase in the first data set.

13. The system of claim 8, wherein the data classifier is an electronic mail classifier.

14. The system of claim 8, wherein the system for generating the first training data set from input data comprises a rule-based system.

15. A computer program comprising program code stored on a computer-readable medium, which when executed, enables a computer system to implement a method for classifying data for a rule-based system, the method comprising:
    generating a first training data set from input data;
    generating a second training data set from disturbed data;
    merging the first training data set and the second training data set; and
    training a data classifier with the merged first training data set and second training data set.

16. The computer program of claim 15, the method further comprising:
    receiving a data set; and
    using the trained data classifier to classify the received data set.

17. The computer program of claim 15, wherein the data comprises text data.

18. The computer program of claim 15, wherein the generating the second data set comprises adding noise or a disturbance to the first data set.

19. The computer program of claim 18, the adding comprising at least one of:
   replacing a term in the first data set with a synonym;
   replacing a term in the first data set with a misspelled term; and
   changing a voice of a phrase in the first data set.

20. The computer program of claim 15, wherein the data classifier is an electronic mail classifier.

21. The computer program of claim 15, wherein the generating the first training data set from input data is done with a rule-based system.

22. A data processing system for classifying data for a rule-based system, comprising:
   a processing unit;
   a bus coupled to the processing unit; and
   a memory medium coupled to the bus comprising program code, which when executed by the processing unit causes the data processing system to:
      generate a first training data set from input data;
      generate a second training data set from disturbed data;
      merge the first training data set and the second training data set; and
      train a data classifier with the merged first training data set and second training data set.

23. A method of generating a system for classifying data for a rule-based system, the method comprising:
   providing a computer system operable to:
      generate a first training data set from input data;
      generate a second training data set from disturbed data;
      merge the first training data set and the second training data set; and
      train a data classifier with the merged first training data set and second training data set.

* * * * *